(12) United States Patent
Kitchen

(10) Patent No.: US 6,286,785 B1
(45) Date of Patent: Sep. 11, 2001

(54) REINFORCEMENT SYSTEM FOR AIRCRAFT FUSELAGE FRAME AND ALUMINUM SKIN

(76) Inventor: Nicholas Donald Kitchen, Colonial Manor, 150 W. Evergreen Ave., Apt. G-2, Phila., PA (US) 19118

( * ) Notice: Subject to any disclaimer, the term of this patent is extended or adjusted under 35 U.S.C. 154(b) by 0 days.

(21) Appl. No.: 09/512,612

(22) Filed: Feb. 25, 2000

Related U.S. Application Data (60) Provisional application No. 60/123,761, filed on Mar. 11, 1999.

(51) Int. Cl.$^7$ ............... B64C 1/00; B64C 1/10; B64C 1/12; B64D 7/00
(52) U.S. Cl. ............ 244/121; 244/120; 244/119; 244/132
(58) Field of Search ............... 244/117 R, 119, 244/120, 121, 132, 133

(56) References Cited

U.S. PATENT DOCUMENTS

| | | | | |
|---|---|---|---|---|
| 4,073,452 | * | 2/1978 | Gosau ................... | 244/121 |
| 4,389,030 | * | 6/1983 | San Miguel ............ | 244/121 |
| 4,404,889 | * | 9/1983 | Miguel .................. | 89/36.02 |
| 5,031,862 | * | 7/1991 | Rhodes .................. | 244/121 |
| 5,102,723 | * | 4/1992 | Pepin .................... | 428/223 |
| 5,198,291 | * | 3/1993 | Kloss, Jr. .............. | 428/288 |
| 5,200,256 | * | 4/1993 | Dunbar ................. | 428/212 |
| 5,376,426 | * | 12/1994 | Harpell et al. ......... | 428/109 |
| 5,429,326 | * | 7/1995 | Garesche et al. ....... | 244/119 |
| 5,645,184 | * | 7/1997 | Rowse et al. .......... | 220/1.5 |
| 5,705,764 | * | 1/1998 | Schade et al. ......... | 89/36.02 |
| 5,788,184 | * | 8/1998 | Eddy .................... | 244/121 |
| 6,092,272 | * | 7/2000 | Durham et al. ........ | 29/421.1 |

* cited by examiner

Primary Examiner—Charles T. Jordan
Assistant Examiner—Christian M. Best (57) ABSTRACT

An aircraft mechanical structural system which provides an improvement to the existing aircraft structure by reinforcing the fuselage frame aluminum skin (3) and fuselage frame (5), without replacement of any of the existing structural elements. The improvement is comprised of high performance, solid fabric (1) fuselage section jackets (13), fuselage frame metal external paneling (4), and a thermal and cryogenic resistant adhesive (23). The jackets (13) are installed between the aluminum skin (3) and fuselage frame metal external paneling (4). The external paneling (4) is installed between the jackets (13) and entire outside surface of the fuselage frame (5). The external paneling (4) provides a solid foundation for the jackets (13) by preventing sagging into openings in the fuselage frame (5). The adhesive (23) bonds the jackets (13) to the aluminum skin (3) and to the external paneling (4). The adhesive (23) prevents premature crimping, abrasion and tearing of the jackets (13), and rivet (22) failure. The adhesive (23) absorbs and dissipates the generated heat, distributing temperatures more evenly across the fuselage structure. The improvement provides physical properties to increase the stiffness and capacity of the airframe to resist high-tension loads generated in high-speed impact accidents and crashes by reducing the probability and extent of fuselage punctures, cuts, tears, breakup, rapid cabin decompression, and subsequent incidence of fire, smoke, toxic gases and explosion. The improvement further includes the potential reduction of pressurization and depressurization cycle stresses during takeoffs and landings which cause metal fatigue and fractures.

14 Claims, 7 Drawing Sheets

REINFORCEMENT SYSTEM FOR AIRCRAFT FUSELAGE FRAME AND ALUMINUM SKIN

CROSS-REFERENCE TO RELATED APPLICATIONS

This application is entitled to the benefit of Provisional Application for Patent, application Ser. No. 60/123,761, filed Mar. 11, 1999.

STATEMENT REGARDING FEDERALLY SPONSORED RESEARCH OR DEVELOPMENT

Not Applicable

REFERENCE TO A MICROFICHE APPENDIX

Not applicable

BACKGROUND OF THE INVENTION

The invention pertains to the field of aircraft mechanical structures, specifically, a safety system designed to provide additional reinforcement for the fuselage frame and aluminum skin by incorporating high performance Kevlar solid fabric for fuselage section jackets, and aircraft aluminum external paneling to provide support for the jackets.

I have no knowledge of prior or existing technology which duplicates the design, construction, operation and scope of my invention.

Aluminum alloy (Alcoa, Inc.) is used for fuselage/wing frames and skins. The thin aluminum skin and fuselage frame, are the only protective barriers (excluding cabin paneling) between the crew, passengers and potential disaster. Aircraft aluminum alloy is efficacious because of its light weight and heat resistance. However, there are several major deficiencies:

1. Aircraft aluminum has a lower tensile strength: ultimate strength by a material at the moment of failure (81,000 psi) than Kevlar (485,000 psi). Aluminum also has a lower modulus of elasticity: material's resistance to extension (10,600,000 psi) than Kevlar (14,000,000 psi).
2. Because of aluminum's low tensile strength and modulus, the fuselage frame and skin have less impact, cut, tear and puncture resistance than Kevlar. When an aircraft crashes at high speed, fracture and disintegration of the aluminum fuselage frame and skin can occur immediately upon impact. These events increase the probability and extent of fire, smoke, toxic gases and explosion, usually resulting in a high incidence of fatalities.
3. The aluminum skin is subject to salt water corrosion (salt water eats away parts) as the plane ages. This could lead to fuselage skin wear and stress fractures ("skin panel lap joints"). The cracks could cause a rapid decompression and lead to a crash or loss of the plane. In one major event, a fuselage crack turned into a hole in the plane, caused a decompression explosion, and ripped off the top of the fuselage (eighteen feet of roof). A flight attendant was sucked out of the plane. The official finding: the fuselage disintegrated after "disbonding of overlapping skin, metal fatigue and separation in the aircraft's skin and structure."

BRIEF SUMMARY OF THE INVENTION

The invention presents a system designed to maintain aircraft structural integrity by providing increased reinforcement to the fuselage frame and aluminum skin, by the addition of fuselage section Kevlar fabric jackets and aircraft fuselage frame aluminum external paneling. The system does not replace any component of the existing mechanical structural system. The main purpose is to prevent the loss of the aircraft during high-speed impact crashes and accidents by reducing the extent of fuselage breakup, thereby increasing crew and passenger survivability.

OBJECTS AND ADVANTAGES

Kevlar fabric did not present instances where significant areas would experience immediate failure or disintegration by impact, tearing, fire or other adverse conditions. Therefore, the use of Kevlar in an primary structure (fuselage), in conjunction with added fuselage frame aluminum external paneling, should strengthen the existing aircraft structural system, which is basically comprised of a thin aluminum skin covering the fuselage frame. Kevlar is superior to aircraft aluminum alloys used for the fuselage frame and skin, in the following areas:

1. Kevlar has higher tensile strength (485,000 psi) and modulus of elasticity (14,000,000 psi) than aluminum. Aluminum has a tensile strength of 81,000 psi and a modulus of 10,600,000 psi. Kevlar's superiority should increase the airframe's capacity to resist high-tension loads in the fuselage during high-speed impact events, and reduce the extent of breakup and disintegration of the aircraft. The majority of accidents occur during takeoff or landing, and involve aborting a takeoff, failed landing gear, overshooting a runway, or running off the side of the runway. In most instances, they are non-fatal. However, if fire erupts, the chance of fatalities greatly increases. Most people who die in plane accidents, die from smoke inhalation or toxic fumes. Therefore, the use of Kevlar with its higher tensile strength and modulus of elasticity, and good thermal resistance, should reduce the probability and extent of fire, smoke, toxic gases and explosion, and increase crew and passenger survivability.
2. Kevlar's superiority to aluminum in tensile strength and modulus, should increase the airframe's capacity to resist penetration and tearing during accidents and crashes. There are numerous cases when aircraft debris and engine parts, such as fan blades/disks, etc., break loose and penetrate the fuselage, strike passengers and cause injuries or deaths. A breach in the fuselage may lead to a decompression explosion and blow away some or all of the fuselage.
3. Kevlar has excellent corrosion resistance. Unlike aluminum, it does not corrode in salt water. Kevlar's applications are well established in the marine environment. It is used for lightweight rope (tough mooring lines used on supertankers), primary umbilical cables for unmanned undersea work vehicles, diving bell support systems and submarine tow cables. Therefore, its use should reduce the incidence and extent of salt water corrosion as a plane ages. This could prevent aircraft fuselage skin stress fractures in the "skin panel lap joints," and subsequent "separation in the aircraft's skin and structure," which can cause rapid decompression and possible crash or loss of the plane. Additionally, Kevlar's thermal corrosion resistance justifies its use for high temperature reinforcement for rocket motor insulation.

BRIEF DESCRIPTION OF THE SEVERAL VIEWS OF THE DRAWING

Drawing Figures

REFERENCE NUMERALS IN DRAWINGS

1 Kevlar Plain Weave Solid Fabric "Crossover Points"
2 Boeing 747-400 Commercial Jetliner (Accommodates 416 Passengers)
3 Fuselage Frame Aluminum Skin
4 Fuselage Frame Aluminum External Paneling
5 Fuselage Frame
6 Nose Fuselage Section
7 Forward Fuselage Section
8 Over-Wing Fuselage Section
9 Aft Fuselage Section
10 Tail-End Fuselage Section
11 Kevlar Solid Fabric Layers
12 Kevlar Fabric Component Piece
13 Fuselage Section Kevlar Fabric Jacket
14 Kevlar Zipper
15 Kevlar Zipper Sliding Piece
16 Kevlar Zipper Pull Tab
17 Kevlar Zipper Bottom Stop
18 Kevlar Thread
19 Kevlar Retaining Track
20 Kevlar Guide Track
21 Kevlar Guide Track Retaining Channel
22 Rivets
23 Room Temperature Vulcanizing (RTV) Silicon Adhesive (Thermal & Cryogenic Resistant)
24 Wings and/or Assembly Site
25 Horizontal Stabilizer and/or Assembly Site
26 Rudder and/or Assembly Site
27 Wheel Bays
28 Windows
29 Doors

DETAILED DESCRIPTION OF THE INVENTION

Properties of System Materials

This section primarily details the properties of two essential structural materials employed in the system, including Kevlar (DuPont Registered Trademark) plain weave solid fabric 1 (FIG. 1) and aircraft aluminum alloys (Alcoa, Inc.). Because aluminum is an established aircraft structural material, its specifications will not be as extensive as those for Kevlar.

Kevlar high performance fiber/fabric, provides the best balance of physical and chemical properties in numerous industrial applications, and is characterized by its long service life (theoretically>100 years under fixed load). Kevlar is used in commercial aircraft for air cargo container liners, tires, damping of noise and vibration applications, cabin panels, etc. Kevlar's properties include: high tensile strength at light weight, high modulus, and resistance to high-speed impact, punctures, cuts, tears, wear, fatigue, creep, high and low temperature extremes, fire, smoke, toxic gases, chemicals and corrosion. The specifications are as follows:

1. High Tensile/Tenacity Strength (strength per linear density unit)—is the ultimate strength by a material at the moment of failure. Kevlar's tenacity is greater than all conventional fibers. Kevlar has a high tenacity which is more than five times that of steel wire and twice that of nylon, polyester or glass fibers. Kevlar 129 has superior strength to aircraft aluminum alloys used for the fuselage frame and aluminum skin. It has a tensile strength of 485,000 pounds per square inch (psi). This exceeds aircraft 2024 aluminum's tensile strength of 70,000 psi, and is greater than the 81,000 psi for aircraft 7075 aluminum. Because Kevlar has greater tensile strength than aircraft aluminum, the system should increase the aircraft's capacity to resist high-speed impact forces generated in high-speed impact accidents and crashes, by reducing high-tension loads in the fuselage, which should decrease the degree of fuselage punctures, cuts, tears, breakup and disintegration.

2. High Modulus—is a material's resistance to extension, representing the stress which produces a specific strain or change in length. Kevlar's modulus, or modulus of elasticity, is about twice that of steel wire or fiberglass, four times that of high tenacity polyester, and nine times that of high tenacity nylon. Kevlar 129's modulus is 14,000,000 pounds per square inch (psi). This exceeds aircraft 2024 aluminum's modulus of 10,600,000 psi, and is greater than the 10,400,000 psi for aircraft 7075 aluminum. Because Kevlar's modulus is greater than aircraft aluminum, it should, in concert with its high tensile strength, decrease the degree of fuselage punctures, cuts, and tears during an accident or crash. Additionally, Kevlar's high modulus of elasticity and low creep should reduce the pressurization and depressurization cycle stresses occurring during take-offs and landings, and potentially extend airframe life.

3. High-Speed Impact Resistance—Kevlar's high-speed impact resistance is attributed to its high tensile strength/modulus and good thermal properties. Kevlar plain weave solid fabrics 1 (FIG. 1) absorb and disperse energy from the fibers impacted to other fibers in the weave of the fabric. This energy transfer occurs at "crossover points" where fabrics are interwoven. The woven fabrics act together to dissipate impact energy, whereby a large fabric area becomes involved in preventing penetration. The energy dissipation reduces impact severity and shock delivered to the protected person or object when the impact force is stopped abruptly. Kevlar has numerous civilian, law enforcement and military applications. Civilian uses: bicycle helmets, boat hulls, mountain climbing ropes and modified air cargo liners (high impact resistance in single thickness). Law Enforcement and military uses include: bullet and fragmentation vests, which have protected thousands of law enforcement and military personnel from serious injury or death. The vests include a soft armor (fabric only). The Type III-A ballistic vest (National Institute of Justice classification) can prevent penetration of 9 mm (124 grain) and .44 Magnum (240 grain) bullets at a velocity of 1400 feet per second (ft/s) and impact energy from 540 to 1045 foot-pounds (ft.-lbs.). A foot-pound is equal to work done by a force of one pound acting through a distance of one foot in the direction of the force. The impact energy (ft.-lb.) is calculated by velocity squared ($V^2$), divided by a factor of 450240× bullet weight in grains: 1400 $V^2$=1960000/450240= 4.3532338×240 grains=1044.7761 ft.-lbs. This provides the highest protection level for soft body armor. When protection is required against high-velocity rifle threats, "Tactical" or "Special Purpose" hard armor, containing hardened steel or ceramic inserts is used. The Type IV vest (National Institute of Justice classification) can stop a .30 caliber (166 grain) armor-piercing bullet at a velocity of 2850 ft./s and impact energy of 2995 ft.-lbs. Kevlar's military applications include: parachutes, arrest cables for aircraft carriers, composite helmets (25%–40% better fragmentation resistance than comparable steel helmets), anti-blast overboots for counter mine operations, explosive ordnance disposal suits, ballistic blankets (ordnance and cargo) and armor protection for military aircraft 4. Cut/Tear/Puncture Resistance—Kevlar has excellent cut resistance to sharp objects because of its high modulus. The fabrics are used for protective apparel: gloves for police, military and industry (gloves/aprons for glass factory and butchery workers). Kevlar's tear strength is more than three times that of nylon which protects parachutes from snagging and flying debris. Parachutist rough terrain suits have increased puncture protection from branches. Firefighters wear Kevlar reinforced boots which can withstand sharp penetrating objects. DuPont's new technology provided correctional officers with the "Kevlar Correctional" stab resistant vest. This was the first all-fabric vest to pass the "California Ice Pick Test." DuPont developed laboratory testing duplicating the drop test procedures. The drop tester plunges a 7 inch ice pick a distance of 5 feet, with a weight of 16.2 pounds and energy level of 81 foot-pounds (5 ft.×16.2 lbs.=81 ft.-lbs.); the fabric was not penetrated. Test results approximate the impact energy of a tossed javelin.

5. Thermal Resistance—is attributed to Kevlar's high tensile strength, high modulus and oxidative stability. It is inherently fame resistant and self-extinguishing; burning of Kevlar usually stops when source of ignition is removed after 12 seconds of contact. Kevlar does not support combustion nor present an explosive hazard. Kevlar fiber has good dimensional stability. This is a very critical property in protective apparel because it ensures the material will not shrink when exposed to elevated temperatures. Kevlar exhibits little strength loss after prolonged exposure at 356° F. (180° C.). It can be used in continuous exposures to temperatures of 392° F. (200° C.). There are no drips which can cause spreading of fire. Kevlar chars at 800° F. (427° C.). As the temperature increases, there is no significant weight reduction until decomposition, occurring at 800° F.–900° F. (427° C.–482° C.). The melting temperature is greater than 986° F. (530° C.). This compares favorably with 2024 aluminum's melting temperature range of 935° F.–1180° F. (502° C.–638 ° C.). In a simulated jet fuel flash fire, nylon melts after a tenth of a second. Kevlar fabric retains support strength for at least five seconds. It does not burn or melt even after ten seconds exposure. Kevlar high performance fiber generates the lowest amount of toxic gases and smoke than conventional fibers such as: acrylic, nylon, wool and polyester. This is an important feature, as toxic gas fumes and smoke from aircraft materials kill the majority of airline passengers. Kevlar shows essentially no embrittlement or degradation under cryogenic conditions at temperatures as low as −320° F. (−196° C.). Kevlar's thermal properties have many applications. Apparel: gloves of 100% Kevlar can withstand extreme heat and are inherently flame resistant; firefighter boots have high resistance to elevated temperatures and sharp objects; coats/suits for firefighters and race car drivers, afford protection from extreme temperatures (shrinkage), hot metals and gas explosions; firefighters can use Kevlar fabrics for short exposures to temperatures up to 932° F. (500° C.). Automotive: Kevlar reinforced rubber tires, belts and hoses, offer higher performance and longer life; Kevlar gaskets (replaced asbestos) retain their modulus at high temperatures, yielding superior stress retention. Aerospace: Kevlar's low thermal conductivity, low density and thermal corrosion resistance, justify its use for high temperature reinforcement for rocket motor insulation.

6. Chemical Resistance—Kevlar is chemically stable under many varieties of exposure conditions. Certain strong aqueous acids and bases can cause degradation over extended time periods, or at high concentrations at elevated temperatures. With respect to aircraft applications, Kevlar is virtually non-reactive to jet fuel.

7. Lighter Weight—Kevlar is slightly heavier than nylon and polyester, but significantly lighter than carbon, glass and steel wire. Kevlar has a superior strength advantage over steel (up to five times stronger) and nylon (three times stronger) on an equal weight basis. Applications: Kevlar provides excellent ballistic performance at low weights. Kevlar reinforced tires are lighter, more durable, and provide weight reduction and improved fuel economy. Ropes are lightweight, low stretch, corrosion resistant and nonconductive. At one-twentieth the weight of steel in water, they provide the strength of steel without its drawbacks of added weight and corrosion. Tough mooring lines are strong enough for use on supertankers, but light enough for one sailor to handle. More than half of U.S. Navy ships are equipped with Kevlar mooring lines. Light weight slings are lighter, stronger and more flexible than steel cables (lift up to 1.5 million pounds), making them much easier to handle. Aircraft and aerospace designers are replacing fiberglass with composites reinforced with Kevlar fiber. A major aircraft manufacturer switched to Kevlar composites and reduced interior and exterior component weight by more than 800 pounds (26% weight savings over fiberglass).

8. Low Creep—creep is a phenomenon of stress relaxation when a fiber is held under stress. It is measured by the increase in fiber length under tension over a period of time, or by the stress reduction of fiber when held in a constant gauge length. At a creep load lower than 50% of the fiber breaking strength, creep is independent of temperature or load. At creep loads above 70% of breaking strength, a secondary creep mechanism with accelerated creep rate occurs. Low creep is a critical requirement for a reinforcing fiber used in structural members. Kevlar's low creep, combined with its high tensile strength, high modulus of elasticity, and thermal and fatigue resistance, could reduce the fuselage cycle stresses: pressurization (expansion) on takeoff, and depressurization (shrinking) upon landing. This could extend airframe life.

Structure of System

Figure 2:
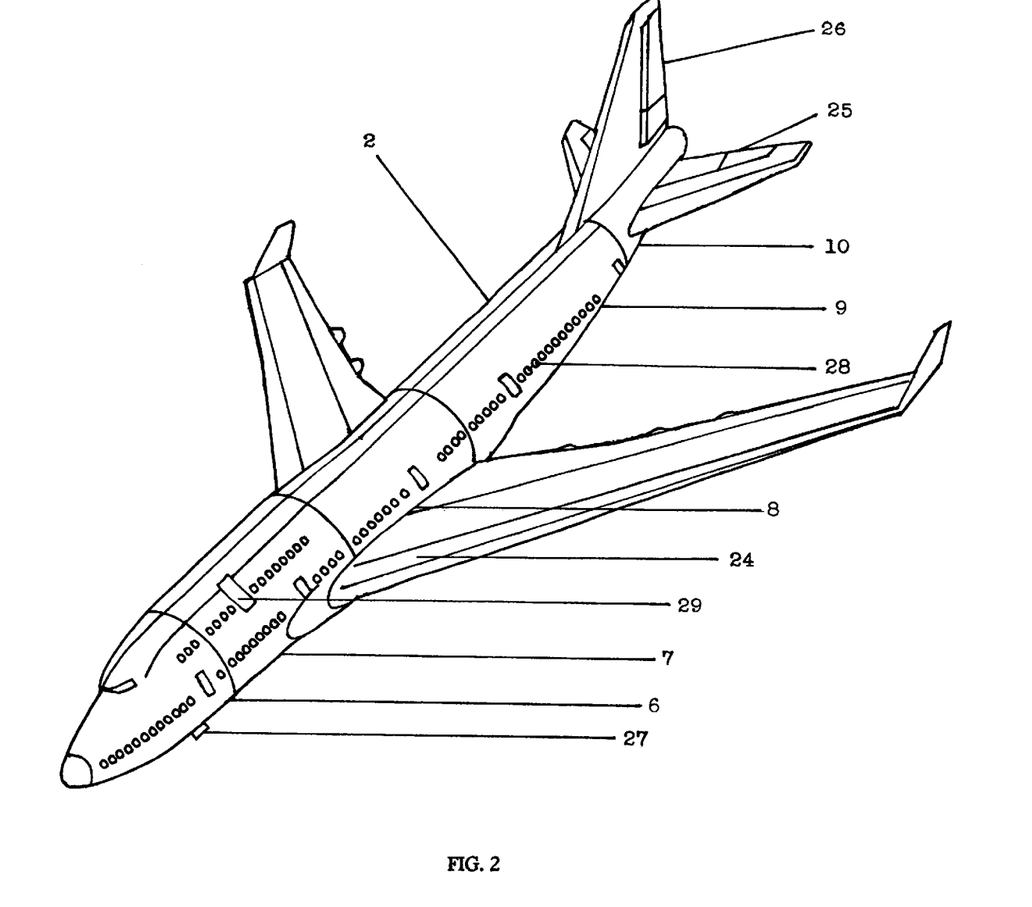
FIG. 2 shows Boeing 747-400 jetliner with main structures.
Figure 4:
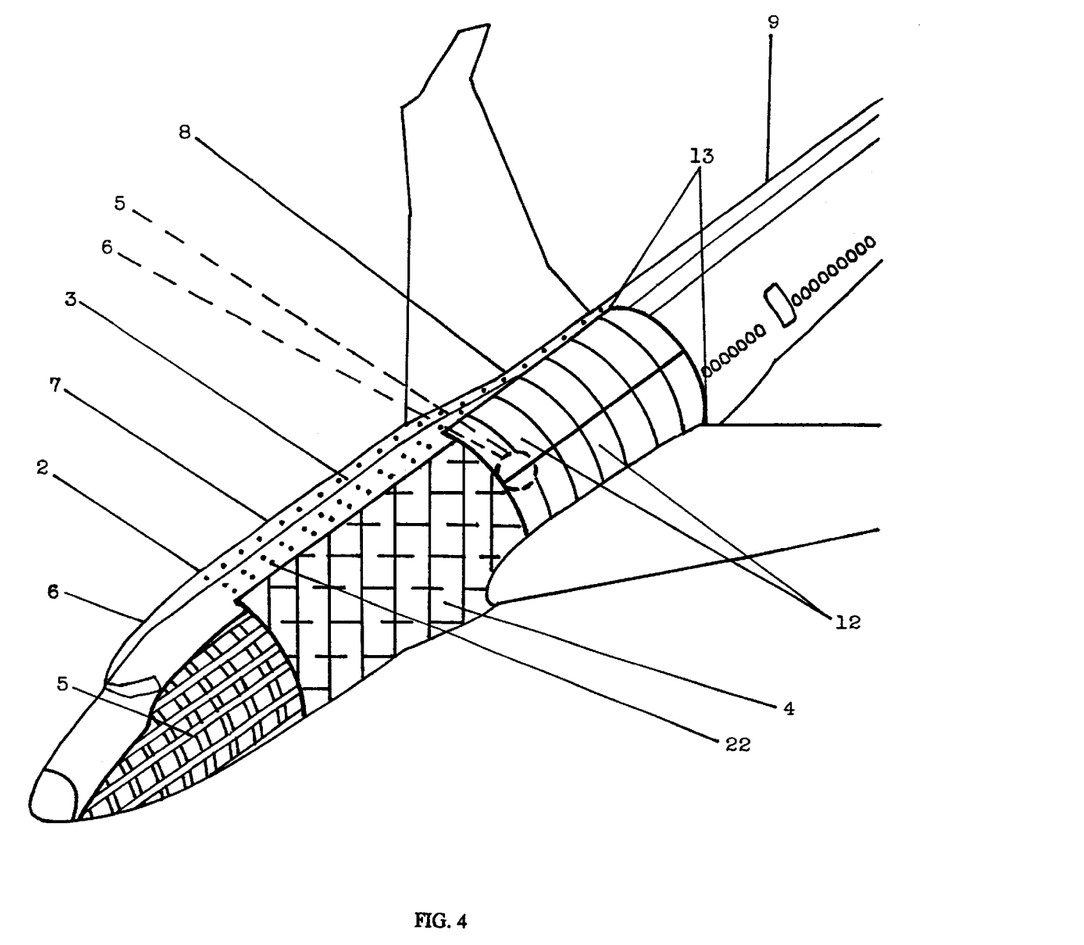
FIG. 4 shows system installed on a Boeing 747-400 jetliner.
Figure 5:
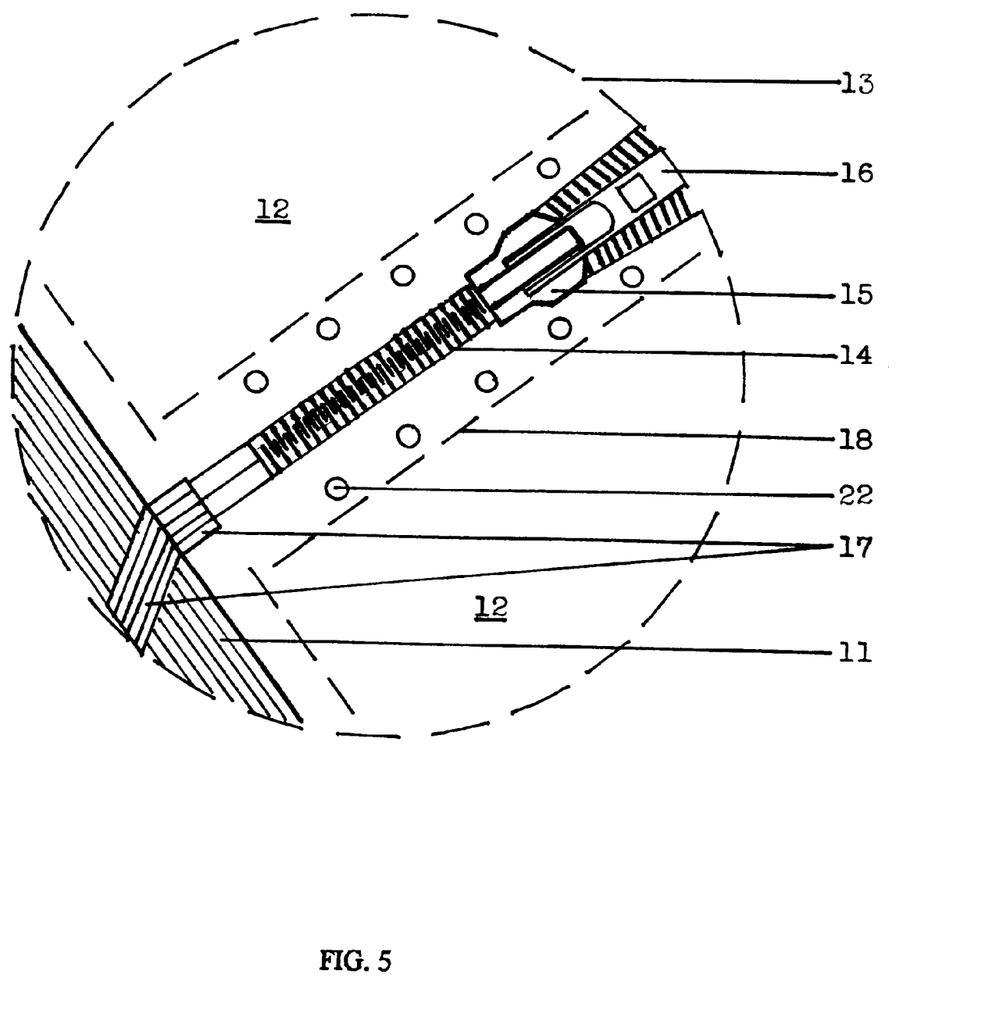
FIG. 5 shows zipper to attach component pieces to create a jacket.
Figure 6:
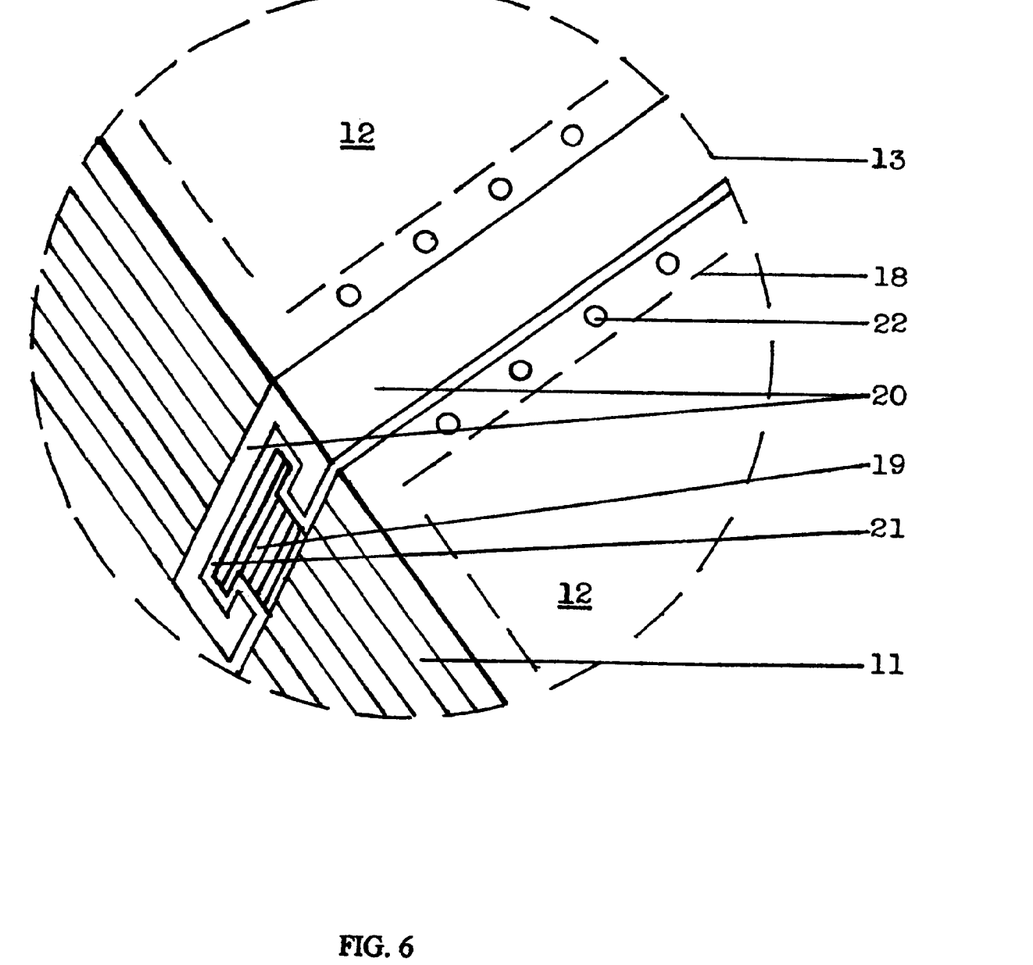
FIG. 6 shows guide/retaining tracks to attach the component pieces to create a jacket
Figure 7:
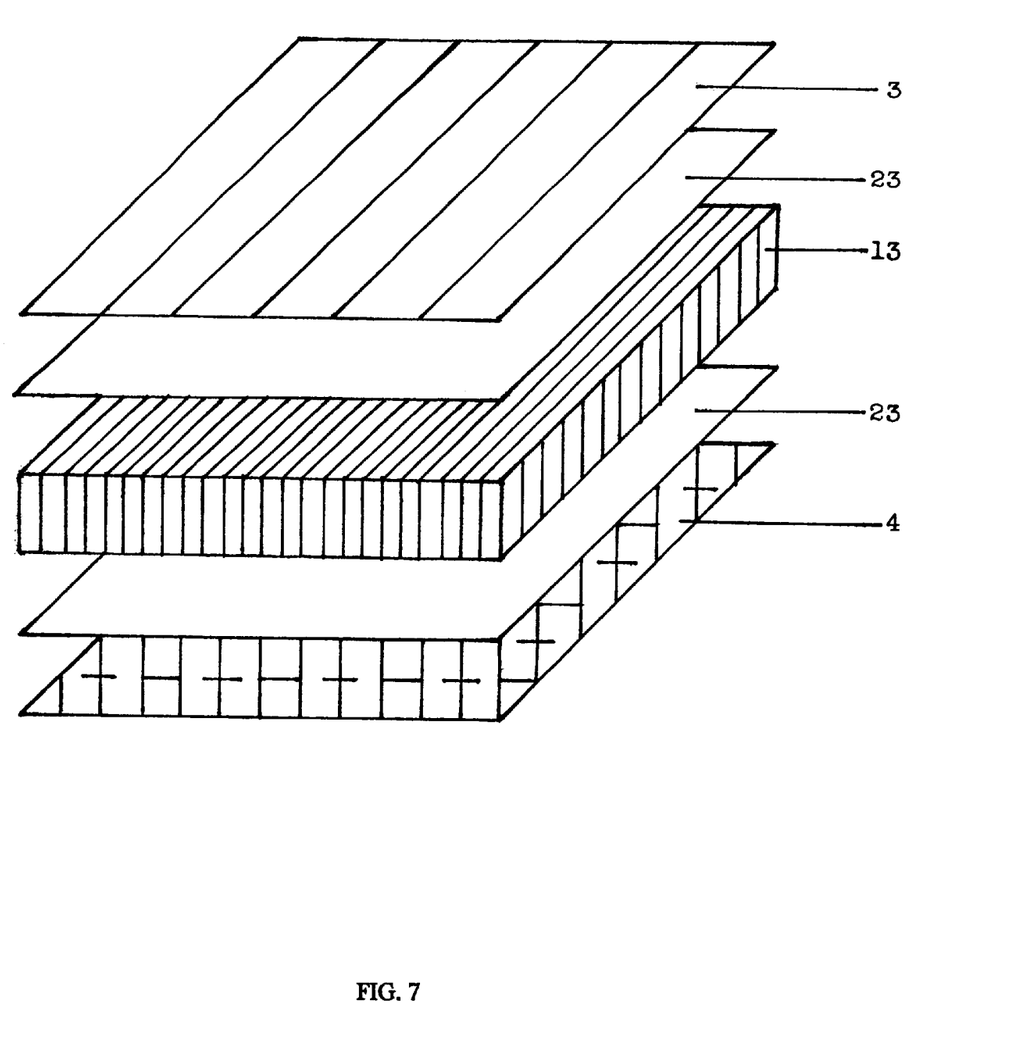
FIG. 7 shows cross-section of the system.

The system uses a Boeing 747-400 commercial jetliner 2 (FIG. 2), 231'-10" long (fuselage: 225"-2') as an example in the description and drawings. The system, including the existing aircraft structure, is comprised of four main elements:

1. Existing fuselage frame aluminum skin 3, which is installed over the fuselage section Kevlar fabric jackets 13 (FIG. 4) and (FIG. 7).
2. Addition of five fuselage section Kevlar fabric jackets 13 (FIG. 3) to cover each of the five fuselage sections 6, 7, 8, 9 & 10 of the jetliner 2 (FIG. 2). Each jacket 13 is comprised of two component pieces 12 (FIG. 3) and (FIG. 4). Each component piece 12 is comprised of eight Kevlar solid fabric layers 11 (FIG. 5) and (FIG. 6). There are ten component pieces 12 comprising the five fuselage section jackets 13 (FIG. 3) for the jetliner 2. The jackets 13 are installed between the aluminum skin 3 and fuselage frame aluminum external paneling 4 (FIG. 4) and (FIG. 7).
3. Addition of fuselage frame aluminum external paneling 4, which is installed between the jackets 13 and over the entire outside surface of the fuselage frame 5 (FIG. 4).
4. Addition of room temperature vulcanizing (RTV) silicon adhesive 23, which bonds the jackets 13 to the aluminum skin 3 and to the external paneling 4 (FIG. 7).

Figure 3:
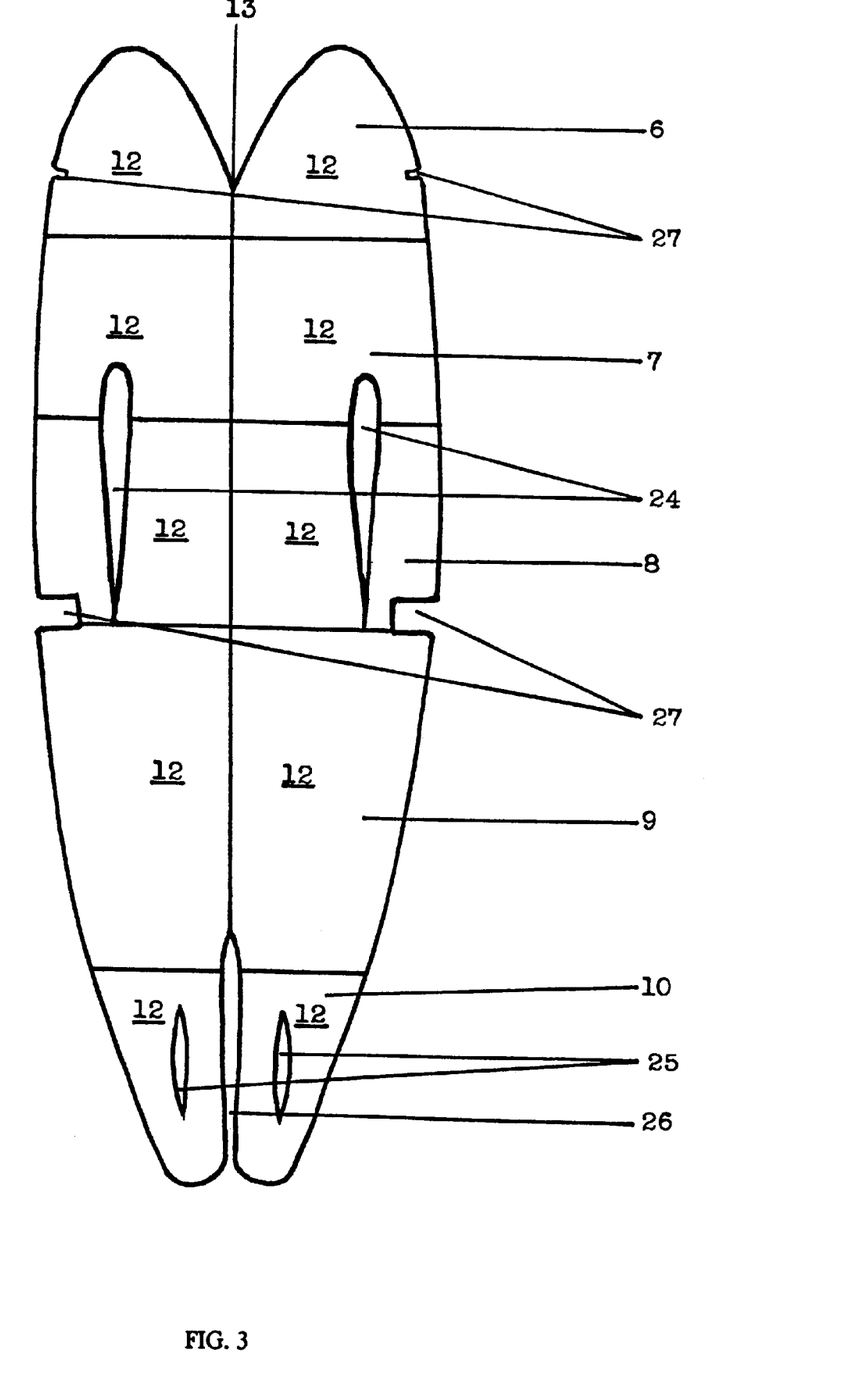
FIG. 3 shows five fuselage section Kevlar fabric jackets with ten component pieces.

The manufacturer or contractor, custom fits each fuselage section 6, 7, 8, 9 & 10, allowing for wings 24, horizontal stabilizer 25, rudder 26, wheel bays 27, windows 28 and doors 29 (FIG. 2) and (FIG. 3). Manufacturing constraints may require each fuselage section 6, 7, 8, 9 & 10 to have more than two component pieces 12 per jacket 13, but the procedure for attaching them, as outlined in "System Assembly and Installation," still applies. It is estimated the jetliner 2 will require approximately 1,503 square yards (one layer) of Kevlar 129 fabric to cover each fuselage section 6, 7, 8, 9 & 10. For purposes of this system, eight solid fabric layers 11 (FIG. 5) and (FIG. 6) for each jacket 13 will be used. Subsequent evaluation and testing of the system under simulated or actual conditions will provide exact requirements. Kevlar 129 fabric is extensively used in civilian body armor. The jackets 13 should have a protection level equivalent to a Type IA bulletproof vest (U.S. Army classification), capable of stopping penetration of a .38 caliber (158 grain) bullet at a velocity of 900 ft./s and impact energy of 284 foot-pounds. It is estimated the jackets 13 and external paneling 4 should have a combined thickness within ¼" to ⅜".

The estimated weight of the Kevlar jackets 13 (eight solid fabric layers 11), requiring 1,503 square yards per layer at 6.8 oz./yd$^2$ (8 layers×639 lbs. per layer), is 5,112 pounds (2.56 tons).

Projected Jacket 13 Requirements per Fuselage Section 6, 7, 8, 9 & 10

| Fuselage Sections | Square Yards (One Layer) | Square Yards (Eight Layers) | Weight (lb.) (One Layer) | Weight (lb.) (Eight Layers) |
|---|---|---|---|---|
| 1. Nose Fuselage Section 6 | 212 | 1,696 | 90 | 720 |
| 2. Forward Fuselage Section 7 | 307 | 2,456 | 130 | 1,040 |
| 3. Over-Wing Fuselage section 8 | 351 | 2,808 | 149 | 1,192 |
| 4. Aft Fuselage Section 9 | 479 | 3,832 | 204 | 1,632 |
| 5. Tail-End Fuselage Section 10 | 154 | 1,232 | 66 | 528 |
| Total | 1,503 | 12,024 | 639 | 5,112 |

The estimated weight of the fuselage frame aluminum external paneling 4, requiring 1,503 square yards at 10.13 oz/yd$^2$, is 952 pounds. The exact specifications (type, weight and thickness) for the external paneling 4 will be determined by subsequent evaluation and testing. Additionally, the thickness and weight of the adhesive 23 will be determined in this phase.

The system's weight of 6,064 pounds (5,112 lbs.+952 lbs.) represents only 4.4% of the 138,858 pounds payload capacity and should not present aerodynamic problems. The following adjustments can be made to accommodate the system. For example, a jetliner 2 carrying 416 passengers and luggage at a projected weight of 89,440 pounds (416× 215 lb/passenger & luggage), could be limited to 387 passengers, weighing 83,205 pounds (387×215 lb/passenger & luggage) and save an estimated 6,235 pounds (29 passengers×215 lb/passenger & luggage). The 6,235 pounds (89,440 lbs.−83,205 lbs.) payload reduction allows for the external paneling 4 (952 lbs.) and Kevlar jackets 13 (5,112 lbs.), which total 6,064 pounds (3.03 tons). An alternative to passenger and luggage reductions, involves using 6,064 pounds for the external paneling 4 and jacket 13 requirements from the remaining payload balance of 49,418 pounds (138,858 lbs. payload capacity−89,440 lbs. for 416 passengers).

System Assembly and Installation

The system assembly and installation processes enumerated below represent a general overview. Actual procedures will be more technical and extensive. Eight Kevlar solid fabric layers 11 are stitched together with Kevlar thread 18 to construct each Kevlar fabric component piece 12 (FIG. 5) and (FIG. 6). Kevlar solid fabric layers 11 can be stitched together with common sewing thread. For purposes of this system, Kevlar thread 18 will be used. The component pieces' 12 zippers 14 (FIG. 5), or retaining 19 and guide 20 tracks (FIG. 6), are attached along their four lengthwise contiguous sides. The crosswise sides, contiguous to the fuselage break points, are stitched along the edges to prevent fraying. The area of each component piece 12 is also stitched crosswise and lengthwise. The spacing between the stitching lines will have to be determined, based on the degree of reinforcement required for the solid fabric layers 11 comprising each jacket 13, to withstand pressurization and depressurization cycle stresses. This step is of major importance for this reason: if the jacket 13 lacks adequate stitching to bind and uniformly reinforce its eight layers 11, the pressurization and depressurization cycle stresses will be primarily directed from the aluminum skin 3, through the adhesive 23, to the top fabric layer; and from the external paneling 4, through the adhesive 23, to the bottom fabric layer. The intermediate layers, two through seven, will not provide an equal amount of reinforcement throughout the jacket 13. This deficiency could lead to early jacket 13 failure.

Room temperature vulcanizing (RTV) silicon adhesive 23 is used to bond the Kevlar fabric jackets 13 to the aluminum skin 3 and external paneling 4 (FIG. 7). The adhesive 23 is applied to prevent premature crimping, abrasion and tearing of the jackets 13, and rivet 22 failure. The thermal and cryogenic adhesive 23 acts as heat sink (absorbs and dissipates the generated heat), distributing temperatures more evenly across the fuselage structure.

Two fabric component pieces 12 comprise one fuselage section Kevlar fabric jacket 13 (FIG. 3) and (FIG. 4). The jackets 13 are installed between the aluminum skin 3 and fuselage frame aluminum external paneling 4 (FIG. 4) and (FIG. 7). They will cover and reinforce the total area of each fuselage section 6, 7, 8, 9 & 10 (FIG. 2) and (FIG. 3). The external paneling 4 is installed over the outside surface of the fuselage frame 5 (FIG. 4) for the five fuselage sections 6, 7, 8, 9 & 10, to provide a solid, smooth, even surface between the fuselage frame 5 and jackets 13. Without the external paneling 4, it is possible the jackets 13 could sag into openings in the fuselage frame 5, causing the aluminum skin 3 to develop surface irregularities and subsequent structural and aerodynamic problems.

There are two options for attaching the component pieces 12 to assemble and install the jackets 13. Further evaluation and testing will be require to ascertain the most efficacious method. Attachment of the component pieces 12 in the first option, utilizes Kevlar zippers 14 (FIG. 5), and in the second, uses retaining 19 and guide 20 tracks (FIG. 6). The procedure for attaching the two component pieces 12 together to assemble the fuselage jacket 13 is essential for the following reason: if the component pieces 12 are not attached to each other, spaces are left between the edges of the component pieces 12. In the event of a crash or accident, the failure to attach the component pieces 12 could increase the degree of fuselage frame 5, external paneling 4, and aluminum skin 3 fracture and breakup.

The system does not attach the jackets 13 across fuselage breakpoints; each fuselage section 6, 7, 8, 9 & 10, has its own jacket 13. However, it should be considered an option if subsequent evaluation and testing conclude system performance could be improved by doing so.

The procedure for the first option to attach and install one fuselage section fabric jacket 13 with Kevlar zippers 14, is as follows:

1. Zippers 14 are attached to the two sides (four sides per jacket) of each component piece (two per jacket) 12 by straight stitching with thread 18 and insertion of rivets 22 on each side (FIG. 5).
2. External paneling 4 for the top-half fuselage section is temporarily secured to the fuselage frame 5 by clamping or other means.
3. Adhesive 23 is applied to the top-half fuselage section of the external paneling 4 where the first contiguous component piece 12 will be bonded.
4. The first contiguous component piece 12 is bonded to the outside surface of the external paneling 4 for the top-half fuselage section.
5. External paneling 4 for the bottom-half fuselage section is temporarily secured to the fuselage frame 5 by clamping or other means.
6. Adhesive 23 is applied to the bottom-half fuselage section of the external paneling 4 where the second contiguous component piece 12 will be bonded.
7. The second contiguous component piece 12 is bonded to the outside surface of the external paneling 4 for the bottom-half fuselage section.
8. The assembly is not riveted 22 to the fuselage frame 5 until the steps below are completed.
9. An overhead crane positions the top-half of the fuselage section onto the bottom-half.
10. The top-half and bottom-half of the fuselage section are joined.
11. The two contiguous component pieces 12 are attached on four sides by inserting each zipper 14 in the component piece's 12 zipper sliding piece 15 and bottom stop 17. Then, by using the pull tab 16, zip the four contiguous sides of the two component pieces 12 together lengthwise to assemble the fuselage jacket 13 (FIG. 5).
12. In the event the zippers 14 cause the jacketed 13 surface to be uneven, preventing a smooth, tight fitting installation of the aluminum skin 3, zipper overlaps could be considered as an option. This potential problem should not be a factor in the second option, as the retaining tracks 19 and guide tracks 20 can be designed to provide a smooth, level surface with the contiguous component pieces 12 (FIG. 6).
13. After the assembly is in place on the fuselage section, adhesive 23 is applied to the inside surface of the aluminum skin 3 for the fuselage section. The aluminum skin 3 is then bonded to the jacket 13 (FIG. 7).
14. The final step in the installation process: the aluminum skin 3, jacket 13, adhesive 23 and external paneling 4, are riveted 22 through and into the fuselage frame 5 (FIG. 4).

The procedure for the second option to attach and install one fuselage section fabric jacket 13 with Kevlar retaining tracks 19 and guide tracks 20, is as follows:

1. Retaining tracks 19 and guide tracks 20 are attached to the two sides (four sides per jacket) of each component piece (two per jacket) 12 by straight stitching with thread 18 and insertion of rivets 22 on each side (FIG. 6).
2. External paneling 4 for the top-half fuselage section is temporarily secured to the fuselage frame 5 by clamping or other means.
3. Adhesive 23 is applied to the top-half fuselage section of the external paneling 4 where the first contiguous component piece 12 will be bonded.
4. The first contiguous component piece 12 is bonded to the outside surface of the external paneling 4 for the top-half fuselage section.
5. External paneling 4 for the bottom-half fuselage section is temporarily secured to the fuselage frame 5 by clamping or other means.
6. Adhesive 23 is applied to the bottom-half fuselage section of the external paneling 4 where the second contiguous component piece 12 will be bonded.
7. The second contiguous component piece 12 is bonded to the outside surface of the external paneling 4 for the bottom-half fuselage section.
8. The assembly is not riveted 22 to the fuselage frame 5 until the steps below are completed.
9. An overhead crane moves the top-half of the fuselage section lengthwise, so the two contiguous sides of the component piece 12 on the top-half section are attached to the two contiguous sides of the component piece 12 on the bottom-half section, by sliding each retaining track 19 lengthwise through the retaining channel 21 of each guide track 20. The attachment of the four contiguous sides of the two component pieces 12 completes the jacket 13 assembly (FIG. 6).

10. The top-half and bottom-half of the fuselage section are joined.
11. After the assembly is in place on the fuselage section, adhesive 23 is applied to the inside surface of the aluminum skin 3 for the fuselage section. The aluminum skin 3 is then bonded to the jacket 13 (FIG. 7).
12. The final step in the installation process: the aluminum skin 3, jacket 13, adhesive 23 and external paneling 4, are riveted 22 through and into the fuselage frame 5 (FIG. 4).

Operation of System

The system's operation is directed to maintain the aircraft's structural integrity by providing increased reinforcement to the fuselage frame 5 and aluminum skin 3. If this objective is accomplished, it should reduce the extent of fuselage breakup during accidents and crashes, and subsequent incidence of fire, smoke, toxic gases and explosion. Increased crew and passenger survivability, and extension of airframe life can be expected.

Given the size of the Boeing 747-400 jetliner 2 (FIG. 2), used as an example in this system (231'-10'''), with a maximum takeoff weight of 870,000 lbs., cruising speed of 552 mph, and 57,065 gallons of volatile jet fuel, major loss of life is almost inevitable in certain crashes: midair and mountain collisions; and aircraft loses power or control, resulting in a free fall into terrain or water.

The system will not improve the survivability rate based on the above events. Highly significant, is the majority of accidents occur during takeoff or landing, and involve aborting a takeoff, failed landing gear, overshooting a runway, or running off the side of the runway. In most instances, they are non-fatal. However, if fire erupts, the chance of fatalities greatly increases. Most people who die in plane accidents and crashes, die from smoke inhalation or toxic fumes. Therefore, Kevlar, with its high tensile strength and modulus of elasticity, and good thermal resistance, should reduce the probability and extent of fire, smoke, toxic gases and explosion. Kevlar's previously enumerated properties should provide increased protection to the plane by resisting puncturing, cutting and tearing of the aluminum skin 3 by flying debris from aircraft parts (fan disks, fan blades, etc.) which can cause rapid cabin air loss, a decompression explosion and loss of the aircraft. If the system performs as stated, increased crew and passenger survivability will result.

Figure 1:
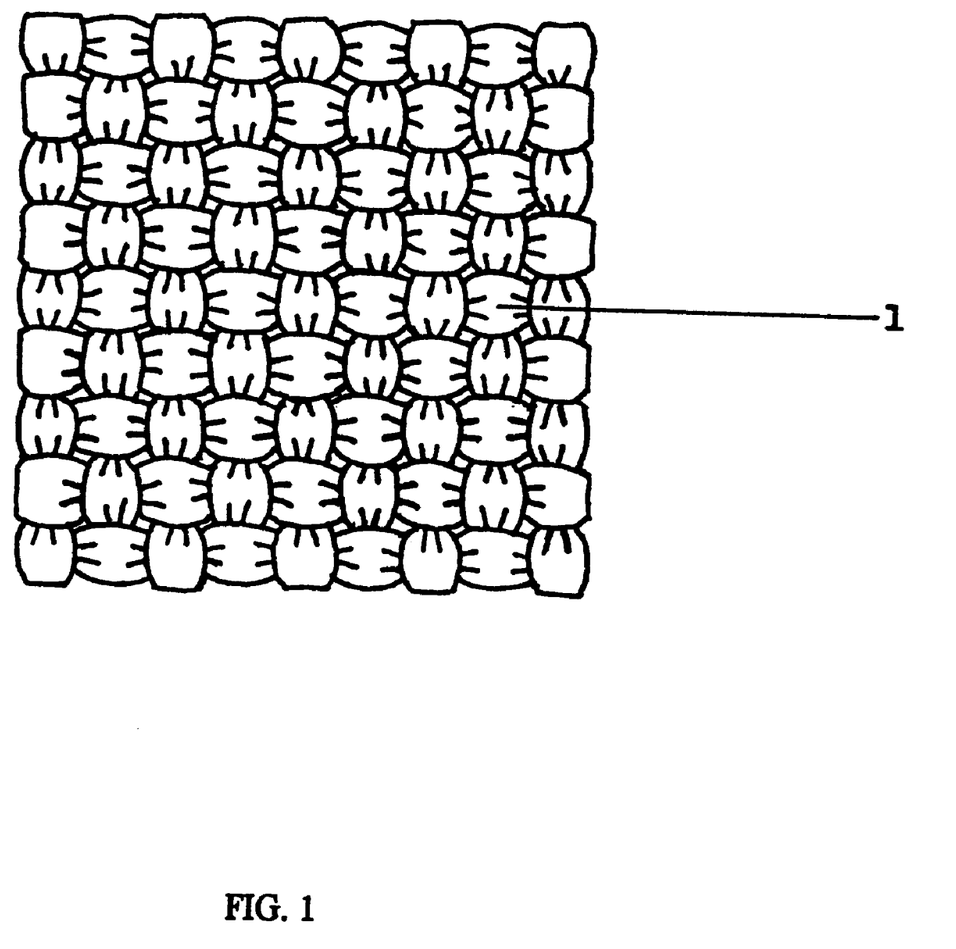
FIG. 1 shows "crossover points" in Kevlar plain weave solid fabric.

Research for this invention did not reveal instances where significant areas of Kevlar would experience immediate failure or disintegration by high-speed impact, fire, tearing or other adverse conditions. Kevlar's high-speed impact resistance is attributed to its high tensile strength/modulus and good thermal properties. Kevlar plain weave solid fabrics 1 absorb and disperse energy from the fibers impacted to other fibers in the weave of the fabric. This energy transfer occurs at "crossover points" where fabrics are interwoven (FIG. 1). It is expected the fuselage section fabric jackets 13 will act together to dissipate impact energy, whereby a large fabric area becomes involved in energy absorption and dissipation by reducing impact severity and shock delivered to the aircraft, when it is subjected to high-tension loads and high-speed impact forces during accidents and crashes. For example, if an aircraft crashes nose first, or on to its belly, the high-speed-impact/energy forces will not be totally concentrated or localized in those areas, but be absorbed and dissipated throughout the aircraft's aluminum skin 3, jackets 13, external paneling 4 and fuselage frame 5, before reaching the passengers in the cabin.

If the system is used in conjunction with state of the art, strengthened seat and belt restraint technology (reduces number of passengers propelled into bulkheads), and if passengers can be kept alive in the location where the greatest concentration of fire is, and they are protected from impact, it should further reduce the number of passengers killed by high-speed impact crashes.

Another major operational function of the system is to reduce the pressurization and depressurization cycle stresses on the airframe. During an aircraft's lifetime, the greatest wear and tear is generated by takeoffs and landings. On each takeoff, pressurization causes the fuselage to expand, as in inflating a tire; and upon each landing, depressurization has the opposite effect by causing fuselage shrinkage. Over extended periods, this can cause fatigue and cracking in the metal. The aircraft's life span is determined by the number of pressurizations and flight hours, in addition to normal wear and tear. The "economic design life" (how long an aircraft is designed to fly) is 20 years or 60,000 cycles (each set of takeoffs and landings).

The system addresses this by the installation of fuselage section Kevlar fabric jackets 13 (FIG. 3), (FIG. 4), (FIG. 5), (FIG. 6) and (FIG. 7). The jackets 13 are bonded to the aluminum skin 3 and external paneling 4 by room temperature vulcanizing (RTV) silicon adhesive 23 (FIG. 7). The adhesive 23 is applied to prevent premature crimping, abrasion and tearing of the jackets 13, and rivet 22 failure. The adhesive 23 is a thin glue (thermal and cryogenic resistant) which reduces thermal expansion during temperature changes of 500° F. and below −170° F. It acts as heat sink by absorbing and dissipating the generated heat, thus, distributing temperatures more evenly across the fuselage structure.

Fuselage section Kevlar fabric jackets 13 were incorporated in the system to increase the airframe's capacity to absorb and disperse energy from pressurization and depressurization cycle stresses. This should reduce fatigue and cracking in the aluminum skin 3 and subsequent deterioration of the fuselage frame 5. This capability can be attributed to Kevlar's numerous applicable properties: high tensile strength at light weight, high modulus of elasticity, stiffness, and resistance to shrinking and cracking at high and low temperature extremes, corrosion, repeated flexing, stretching, wear, fatigue and low creep (measured by increase in fiber length under tension over a period of time). Low creep is a critical requirement for a reinforcing fiber used in structural members. The system could reduce the pressurization and depressurization cycle stresses, and ultimately extend airframe life.

Conclusion, Ramifications, and Scope of Invention

Kevlar provides the best balance of physical and chemical properties: high tensile strength at light weight, high modulus, and resistance to high-speed impact, punctures, cuts, tears, wear, fatigue, creep, shrinking and cracking at high and low temperature extremes, fire, smoke, toxic gases, chemicals and corrosion. The fuselage section Kevlar fabric jackets, adhesive and fuselage frame aluminum external paneling, add a new dimension to present aircraft mechanical structures. It is a complementary system which provides additional reinforcement, not replacement of existing aircraft structural components.

If the system accomplishes the stated objectives, Kevlar's properties enumerated above, should increase the airframe's stiffness, and its capacity to resist high-tension loads generated in high-speed impact accidents and crashes. This could reduce the probability and extent of fuselage punctures, cuts, tears, breakup, and rapid cabin decompression. The subsequent incidence of fire, smoke, toxic gases and explosion, should also decrease, preventing possible loss of the aircraft, and increasing crew and passenger survivability. Additionally, the system should increase the aircraft's capacity to maintain its shape and function over time, by reducing pressurization and depressurization cycle stresses during takeoffs and landings, which cause metal fatigue and fractures. This could extend airframe longevity.

While the above description contains numerous specific details, these should not be construed as limitations on the scope of the invention, but rather as providing illustrations of some of the preferred embodiments of this invention. Many variations are possible. For example:

1. The invention uses a Boeing 747-400 commercial jetliner as an example for system installation. The system could have applications for other aircraft types than just commercial. These include: amateur/home-built and manufactured (private, corporate, transport, military and aerospace).
2. The system uses Kevlar solid fabric and aircraft aluminum to construct the jackets and external paneling. Subsequent evaluation and testing may require incorporating other high performance materials to replace, or be used in conjunction (hybrid) with Kevlar and aluminum. Many have outstanding properties: tensile strength, modulus, and thermal compressive, shear and solvent resistance.
3. Other high performance materials could improve the system's mechanical properties. This may involve using a composite system whose structure may be varied by combining different fiber matrix systems and aluminum sheet alloys in a different stacking sequence. Also, the number and thickness of plies may be varied, and the fiber orientation may be modified by aligning the fiber plies in different angles to the axis, in order to increase the airframe's capacity to withstand multidirectional loading stresses.

Accordingly, the scope of the invention should be determined not by the embodiment(s) illustrated, but by the appended claims and their legal equivalents.

What I claim as my invention is:

1. A reinforcement system for an aircraft comprising a fuselage frame aluminum skin, and fuselage frame aluminum skin being attached to a fuselage frame of said aircraft, wherein the system provides additional reinforcement to said aircraft without replacing any of its elements, the improvement comprising:
   (a) one or more fuselage section fabric jackets constructed of a lightweight, high performance solid fabric, with physical properties including: reduced air permeability, high tensile strength, high modulus and stiffness, and resistance to impact, punctures, cuts, tears, wear, fatigue, creep, repeated flexing, stretching, chemicals and corrosion, and thermal resistance to shrinking and cracking at high and low temperature extremes, fire, smoke and toxic gases; and
   (b) one or more said fuselage section fabric jackets installed between said fuselage frame aluminum skin and fuselage frame metal external paneling, covering one or more fuselage sections of entire said fuselage frame of said aircraft; and
   (c) said fuselage frame metal external paneling installed between said fuselage section fabric jackets and outside surface of entire said fuselage frame of said aircraft; and
   (d) an adhesive, bonding said fuselage section fabric to said fuselage frame aluminum skin and to said fuselage metal external paneling, preventing premature crimping, abrasion and tearing of said fuselage section fabric jackets, and rivet failure; and
   (e) an installation completed by riveting through in sequence: said fuselage frame aluminum skin, said adhesive, said fuselage section fabric jackets, said adhesive, said fuselage frame metal external paneling, into entire said fuselage frame of said aircraft.

2. The reinforcement system of claim 1, wherein one or more said fuselage section fabric jackets are comprised of a plurality of fabric component pieces constructed of said solid fabric.

3. The reinforcement system of claim 2, wherein one or more said fuselage section fabric jackets are comprised of a said fabric component pieces for one or more said fuselage sections of said aircraft.

4. The reinforcement system of claim 3, wherein said fabric component pieces are comprised of one or more layers of said solid fabric.

5. The reinforcement system of claim 4, wherein said fuselage section fabric jackets are comprised of a soft, non-impregnated, woven said solid fabric.

6. The reinforcement system of claim 5, wherein said solid fabric comprising said fuselage section fabric jackets has said tensile strength equal to 485,000 psi, and said modulus equal to 14,000,000 psi.

7. The reinforcement system of claim 6, wherein said solid fabric comprising said fuselage section fabric jackets can be used in continuous exposures to temperatures of 392° F., short exposures up to 932° F., and to cryogenic temperatures as low as −320° F.

8. The reinforcement system of claim 1, wherein said fuselage metal external paneling provides a solid foundation to prevent said fuselage section fabric jackets from sagging into openings of said fuselage frame.

9. The reinforcement system of claim 8, wherein said fuselage frame metal external paneling is constructed of an aircraft aluminum.

10. The reinforcement system of claim 9, wherein said aircraft aluminum comprising said fuselage frame metal external paneling has said tensile strength between 70,000 psi and 81,000 psi, and said modulus between 10,400,000 psi and 10,600,000 psi.

11. The reinforcement system of claim 1, wherein said adhesive, with thermal and cryogenic resistance, acts to absorb generated heat more evenly across fuselage structure, and reduces thermal expansion during temperature changes between 500° F. and below −170° F.

12. The reinforcement system of claim 1, wherein the improvement provides means to increase stiffness and capacity of said fuselage aluminum skin and said fuselage frame to resist high-tension loads generated in high-speed impact accidents and crashes, thereby reducing extent of fuselage punctures, cuts, tears, breakup, fire, smoke, toxic gases and explosion, whereby potentially preventing loss of said aircraft, and increasing crew and passenger survivability.

13. The reinforcement system of claim 1, wherein the improvement provides means to reduce rapid cabin air loss from decompression in event said fuselage frame aluminum skin is punctured, cut, torn or broken up, whereby potentially preventing explosion and loss of said aircraft, and increasing crew and passenger survivability.

14. The reinforcement system of claim 1, wherein the improvement means to reduce pressurization and depressurization cycle stresses of said fuselage frame aluminum skin and said fuselage frame during takeoffs and landings which cause metal fatigue and fractures, whereby potentially extending airframe life.

* * * * *

UNITED STATES PATENT AND TRADEMARK OFFICE
CERTIFICATE OF CORRECTION

PATENT NO. : 6,286,785 B1
DATED : September 11, 2001
INVENTOR(S) : Nicholas Donald Kitchen It is certified that error appears in the above-identified patent and that said Letters Patent is hereby corrected as shown below:

Column 3,
Line 15, change "jacket" to -- jacket. --.
Line 46, change "Rudder and/or Assembly Site" to -- Vertical Tail/Rudder and/or Assembly Site --.

Column 5,
Line 22, change "aircraft" to -- aircraft. --.

Column 7,
Line 4, change "(fuselage: 225"-2')" to -- (fuselage: 225'-2") --.
Line 32, change "rudder" to -- vertical tail/rudder --.
Line 66, change "section" to -- Section --.

Column 9,
Line 25, change "require" to -- required --.

Column 11,
Line 25, change "(231'-10'")" to -- (231'-10") --.
Line 66, change "high-speed-impact/energy" to -- high-speed impact/energy --.

Column 12,
Line 23, change "aicraft" to -- aircraft --.

Column 13,
Line 32, change "thermal compressive" to -- thermal, compressive --.
Line 49, change "and" to -- said --.

Column 14,
Line 5, change "fuselage section fabric" to -- fuselage section fabric jackets --.
Lines 6 and 7, change "fuselage metal external paneling" to -- fuselage frame metal external paneling --.
Lines 20 and 21, change "comprised of a said fabric component pieces" to -- comprised of a plurality of said fabric component pieces --.
Line 39, change "fuselage metal external paneling" to -- fuselage frame metal external paneling --.
Line 57, change "fuselage aluminum skin" to -- fuselage frame aluminum skin --.

UNITED STATES PATENT AND TRADEMARK OFFICE
CERTIFICATE OF CORRECTION

PATENT NO.    : 6,286,785 B1
DATED         : September 11, 2001
INVENTOR(S)   : Nicholas Donald Kitchen It is certified that error appears in the above-identified patent and that said Letters Patent is hereby corrected as shown below:

<u>Column 15,</u>
Line 4, change "improvement means" to -- improvement provides means --.

Signed and Sealed this

Fourth Day of June, 2002

Attest:

Attesting Officer

JAMES E. ROGAN
*Director of the United States Patent and Trademark Office*